April 27, 1965 R. M. VAUGHN 3,180,203
RADIALLY EXPANDABLE TWO-PIECE BLIND FASTENER
Filed March 28, 1963 2 Sheets-Sheet 1

INVENTOR.
RUDOLPH M. VAUGHN
BY Elliott & Pastoriza
ATTORNEYS.

April 27, 1965 R. M. VAUGHN 3,180,203
RADIALLY EXPANDABLE TWO-PIECE BLIND FASTENER
Filed March 28, 1963 2 Sheets-Sheet 2

INVENTOR.
RUDOLPH M. VAUGHN
BY
*Elliott & Pastoriza*
ATTORNEYS.

United States Patent Office 3,180,203
Patented Apr. 27, 1965

3,180,203
RADIALLY EXPANDABLE TWO-PIECE
BLIND FASTENER
Rudolph M. Vaughn, 611 Lido Park Drive,
Newport Beach, Calif.
Filed Mar. 28, 1963, Ser. No. 268,786
7 Claims. (Cl. 85—70)

This application constitutes a continuation-in-part of my co-pending patent application Serial No. 215,074 filed August 6, 1962, and entitled Two-Piece Fastener, now abandoned.

This invention relates generally to fastening devices and more particularly to an improved two-piece blind fastener for securing together members from one side only.

In my above referred to co-pending application, there is disclosed a novel two-piece fastener including a screw having a shank portion of given diameter merging into a smaller diameter threaded portion. A nut is receivable on the threaded portion and is of external diameter substantially corresponding to the external diameter of the shank portion of the screw. With this arrangement, both the nut and screw may simultaneously be passed through aligned openings in members to be fastened together wherein the openings themselves are of a diameter just sufficient to accommodate the shank portion of the screw. After the nut has been passed through the aligned openings, suitable external threaded portions defined in part by flaring whiskers on the nut serve to frictionally hold the nut against rotation so threading of the screw further into the nut will cause a collapsing of the nut in column with resulting radial expansion to secure the two members together.

In the above described screw and nut structure, there existed the possibility of the nut initially being threaded onto the threaded portion of the screw to such an extent that when the same were passed through the aligned openings, there was not provided sufficient room for the radially flared whiskers to all collapse thus rendering insertion of the assembled nut and screw difficult. As a further consequence of too much threading prior to insertion, the nut might be positioned so close to the head of the screw that a proper "grip" of the nut to one of the members to prevent the nut from rotating prior to collapsing thereof would not be effected.

Another possible problem in two-piece fasteners resided in the mechanics of actual column collapsing of the nut itself. Thus, in the nut as described heretofore, there is provided a thin walled section adapted to collapse in column when the screw is tightened up after the members have been passed through aligned openings. However, because of the uniform thickness of the thin walled section, the commencement of the collapsing in column could occur almost anywhere along the length of the section of the nut. Thus, if the collapsing occurred midway of the section, a loose joint might result.

A feature not disclosed in my prior co-pending patent application which is desirable in a two-piece fastener is the provision of means for substantially permanently locking the nut to the screw itself so that unthreading of the screw cannot be achieved.

With the foregoing in mind, it is accordingly a primary object of the present invention to provide an improved two-piece blind fastener in which the various problems set forth above are overcome.

More particularly, it is an object to provide an improved two-piece blind fastener including novel means for initially spacing the nut with respect to the screw so that it may very easily be inserted through aligned openings.

Another object is to provide means for positioning the nut with respect to the screw during pre-assembly operations so that it will be spaced relative to the head of the screw in accordance with the length of the openings through which the assembly is to be passed.

Still another important object is to provide an improved nut structure so designed that the nut will collapse in a manner commencing at the inner end of the nut immediately in contact with one of the members to be fastened together and then progress towards the other or outer end of the nut during the column collapsing thereof so that a very tight joint will result.

Still another important object is to provide an improved two-piece blind fastener including means whereby the nut may be substantially permanently locked to the screw after the same has been collapsed in column.

Another object of this invention is to provide a two-piece fastener capable of accommodating variations in hole diameter through which the fastener is passed.

Another object of this invention is to provide a novel method of pre-assembling a two-piece screw and nut in such a manner that they may be readily inserted through aligned openings in members to be fastened together from one side.

Still another object is to provide a novel method of manufacturing the nut employed in the two-piece fastener.

Briefly, these and many other objects such as set forth in my referred to co-pending application are attained by providing a screw having a shank portion merging into a smaller diameter threaded portion to define an annular sloping shoulder. Cooperating with this screw is a cylindrically shaped nut member adapted to be threadedly received on the threaded portion of the screw and including a thin tapered wall section becoming thinner in a direction towards the head of the screw. The external portion of this thin tapered wall section includes integrally formed whiskers generally angulated with respect to the axis of the nut in a direction opposite to the thread direction of the threaded portion of the screw. These whiskers are also flared radially outward with the exception of at least one whisker which is purposely bent or formed inwardly in a position such that its extreme end extends ahead of the ends of the other whiskers. By this arrangement, the nut may be pre-threaded onto the screw in a pre-assembly operation so that the one whisker will engage the annular sloping shoulder portion of the screw and properly space the nut so that there will be provided room for the other whiskers to radially depress when the assembly is urged through aligned openings. Further, as a consequence of the tapered wall section, the column collapsing of the nut will take place initially from the inner end of the nut engaging the peripheral portion of the exit opening in one of the members and progress uniformly towards the outer end so that a very tight joint will result when the screw is threaded further into the nut.

In addition, by providing an annular groove in the annular sloping shoulder portion of the screw, the expanded nut material will be received in the screw to thereby lock the nut to the screw and prevent any inadvertent unthreading of the screw from the nut after the members have been fastened together.

The method of pre-assembly of the invention contemplates the steps of deforming an integral portion of the nut which, in the preferred embodiment, constitutes at least one of the whiskers involved so that it will engage the annular sloping shoulder portion ahead of other portions of the nut and thereby properly space the nut; and threading the nut up to a position in which such actual contact takes place. The pre-assembled screw and nut may then be passed through aligned openings of given length in a member and proper securing of the members together will be assured.

In accordance with the method of manufacturing the nut, a piece of bar stock is cut to proper length and knurled to provide a left hand thread or angulating of the knurl. The bar is then counter bored and internally threaded. Next, a tapering tool is employed to provide a wall taper and cut the inner wall surface of the knurled portion to define separate knurls forming the whiskers. Finally the end portions of the whiskers are radially flared.

A better understanding of the improved two-piece blind fastener of this invention as well as the method of pre-assembly and manufacture thereof will be had by now referring to the accompanying drawings, in which.

Figure 1:
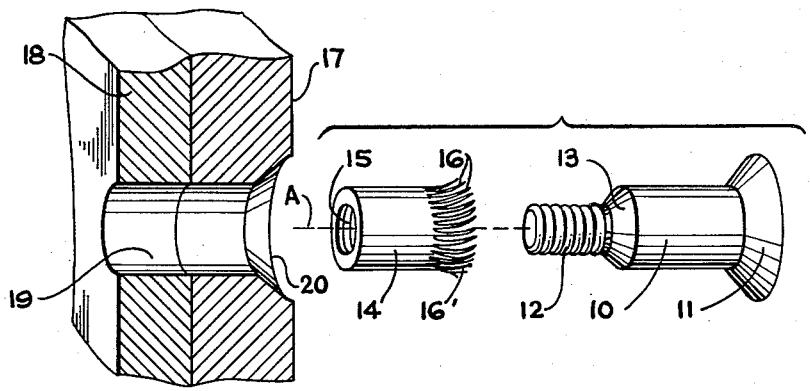
FIGURE 1 is an exploded perspective view partly cut away illustrating the basic elements of the improved two-piece blind fastener of this invention preparatory to assembly and insertion through aligned openings in first and second members to be fastened together.

Referring first to FIGURE 1, the two-piece blind fastener includes a screw having a shank portion 10 terminating at one end in an enlarged head 11 and merging into a lesser diameter threaded portion 12 at its other end. Between the shank and threaded portions, there is defined an annular sloping shoulder 13. Cooperating with the screw is a cylindrically shaped nut member 14 having internal threads 15 at its outer end for threaded engagement with the threaded portion 12 of the screw, and a plurality of integral whiskers 16 at its inner end. These whiskers are externally formed and as noted in FIGURE 1 are angulated with respect to the axis of the nut 14 and flared radially outwardly at their extreme ends. At least one of these whiskers such as indicated at 16', however, is deformed radially inwardly relative to the other whiskers, the purpose for which will become clearer as the description proceeds.

As shown in FIGURE 1, there are provided first and second members 17 and 18 to be fastened together. These members include aligned openings indicated generally at 19, the first member 17 including a counter-sunk tapered entrance 20 for seating the enlarged head 11 of the screw.

Figure 2:
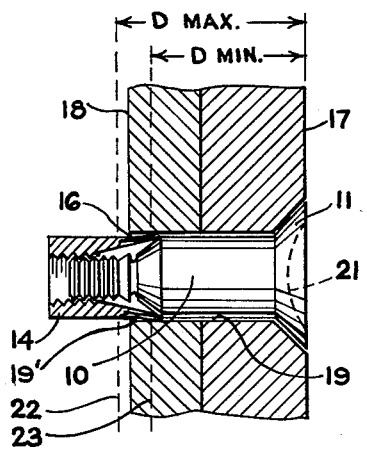
FIGURE 2 is an elevational fragmentary view partly in cross section illustrating the relative positioning of the two-piece fastener within the aligned openings of the members prior to the actual fastening operation.
Figure 3:
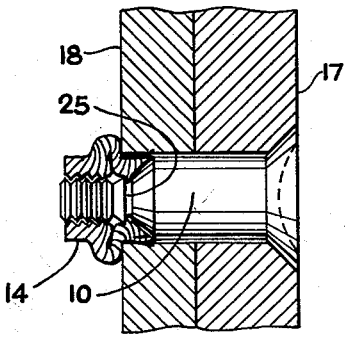
FIGURE 3 is a view similar to FIGURE 2 showing the relative position of the elements of the fastener after tightening of the fastener to secure the first and second members together.

Referring now to FIGURE 2, the screw and nut are shown in pre-assembled relationship in position within the aligned openings 19 of the members 17 and 18. In this position, it will be noted that the whiskers 16 engage frictionally the inner peripheral exit portion 19' of the opening in the second member 18. The nut is thus held against rotation so that further threading of the screw by means of the screw slot 21 will cause the nut to collapse in column to secure the members together. FIGURE 3 illustrates the deformation of the nut after the further threading of the screw.

The length of the whiskers is so designed that a certain variation in overall thickness or "grip distance" of the members 17 and 18 may be tolerated. Thus, as indicated by the vertical dash lines 22 and 23, should the overall thickness of the members 17 and 18 or length of the aligned openings 19 extend to the dashed line 22, the whiskers 16 will still be in sufficient frictional engagement with the inner peripheral portion 19' of the exit opening to prevent rotation of the nut. Further, if the overall length of the openings is defined by the vertical dashed line 23 for a minimum grip situation, the length of the whiskers 16 is such that the extreme ends thereof will still be in engagement with the peripheral exit portion of the opening.

Figure 4:
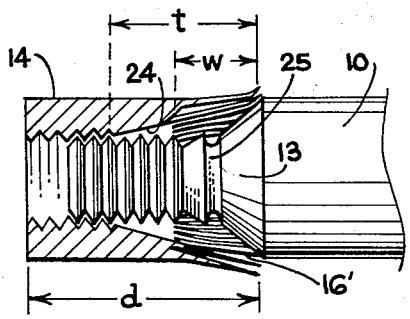
FIGURE 4 is an enlarged elevational fragmentary view partly in cross section useful in explaining pre-assembly operations in accordance with the method of the invention.

With particular reference now to FIGURE 4, there is illustrated in enlarged view the nut 14 pre-assembled on the threaded portion of the screw. As shown, the bent whisker 16' will engage the annular sloping shoulder 13 of the screw prior to engagement of this portion by the other whiskers. As a consequence, the relative degree of threading of the nut 14 is checked by this one whisker 16' so that there will remain adequate room for the other whiskers to be compressed when the nut and screw are passed through aligned openings of members to be fastened together. In this connection, by flaring of the whiskers at their ends to the extent of three to four times the hole tolerance in the members to be fastened together, the nut and screw will function in holes of varying diameter so that allowance is made for large hole tolerances. Also, the nut 14 will be properly spaced with respect to the head end of the screw as illustrated in FIGURE 2 so that the whiskers 16 will engage a peripheral portion of the exit opening as indicated at 19' within the accommodation defined by the minimum and maximum grip lines 22 and 23.

As shown in FIGURE 4, the interior wall of the nut is tapered at 24 over a length of the nut designated by the letter $t$. Preferably, this length is at least twice the length $w$ of the whiskers. This dimensioning is important in order that the minimum and maximum grips described in FIGURE 2 may be accommodated and a yielding or column collapsing of the nut still take place.

Further, by forming a tapered walled section, the nut will commence collapsing at that portion in engagement with the immediate peripheral exit portion of the opening of the second member as indicated at 19', the collapsing then continuing towards the outer end of the nut in a progressive manner so that an extremely tight joint is assured. The tapered section wall portion is thus an important feature of this invention as it insures the desired progressive yielding of the inner end of the nut towards the outer end when collapsing. Lack of such a taper might result in any one circumferential portion of the nut initially expanding when the screw is tightened with the resulting possibility of a loose joint.

In accordance with still another feature of the invention, and as clearly illustrated in FIGURE 4, the annular sloping shoulder portion 13 is provided with an annular groove 25. The inner diameter or minimum diameter of the floor of this groove is no less than the minor diameter of the screw threads to avoid weakening of the screw in shear. This groove serves an important function in that it will receive collapsed material of the nut when the screw is tightened and thereby thoroughly lock the nut 14 to the screw. The reception of a portion of the material of the nut 14 within the annular groove 25 is illustrated in FIGURE 3.

In accordance with the method of pre-assembly of the invention, at least one of the whiskers of the nut is bent downwardly as indicated at 16' so that it will initially engage the annular sloping shoulder portion 13 of the screw. The nut is then threaded until this whisker 16' does engage the annular shoulder. At this point, it will be properly spaced with respect to the annular sloping shoulder. This space is indicated by the letter $d$ in FIGURE 4 and insures that there is provided sufficient room for the remaining whiskers to be compressed when the pre-assembled elements are inserted through aligned openings.

The overall operation of the improved two-piece blind fastener will be evident from the foregoing description. As stated, the nut is initially threaded onto the screw, and because its external diameter corresponds to that of the shank portion 10 of the screw, both the screw and nut may readily be passed through aligned openings such as 19 in the members 17 and 18 to be fastened together. After being passed through the openings as illustrated in FIGURE 2, the screw 10 is simply tightened by a power or hand tool received within the slot 21 to effect the desired radial column collapsing of the nut as illustrated in FIGURE 2. In actual practice, the screws would be supplied with the nuts pre-assembled thereon.

With particular reference now to FIGS. 5, 6, 7, and 8 the method of manufacturing the nut 14 will be described. Initially, the material for the nut 14 is cut from bar stock and then a steep pitched knurl is rolled by means of a tool 26 bearing against one end portion of the nut. The resulting knurls are indicated at 27 and are angulated with respect to the axis of the nut.

Figure 5:
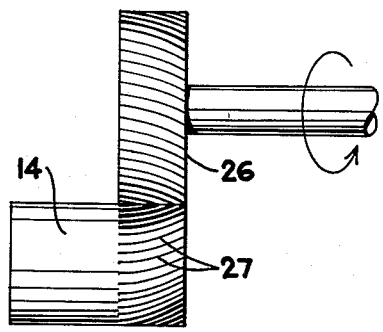
FIGURE 5 is a schematic illustration of a first step in the manufacture of the two piece fastener.
Figure 6:
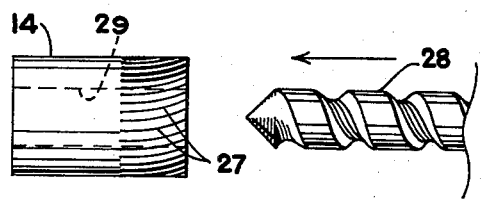
FIGURE 6 is a view similar to FIGURE 5 showing a second step.

After the knurl has been rolled on to the end portion of the nut as shown in FIG. 5, the nut is bored through its center by a bore tool 28 as illustrated in FIG. 6 to provide a central bore 29.

Figure 7:
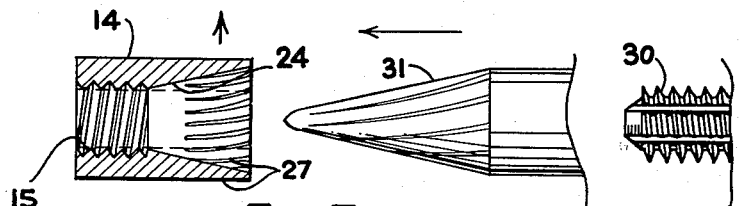
FIGURE 7 is another view illustrating subsequent steps in the method.

The next step in the manufacturing method is illustrated in FIG. 7 wherein the inner left portion of the bore is internally threaded to provide the threads 15 as by an internal threading instrument 30. Also, the right hand end of the bore is machined to provide the taper 24 as by a machining tapering tool 31. During this tapering operation, the right hand wall portions of the nut 14 are thinned to an extent to break through between the knurls and thus define the desired whiskers.

Figure 8:
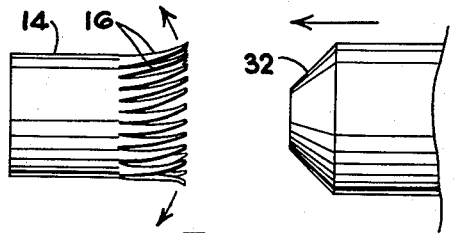
FIGURE 8 shows a final step in the manufacture of the fastener.

Finally, the whiskers are flared radially as shown in FIG. 8 by simply inserting a tool 32 having a bevelled angular shoulder to press outwardly the end portions of the whiskers so that the resulting structure provides whiskers 16 as described in conjunction with FIG. 1.

From the foregoing description, it will thus be evident that the present invention has provided a greatly improved two-piece blind fastener. Various modifications that fall clearly within the scope and spirit of this invention will occur to those skilled in the art. The fastener is therefore not to be thought of as limited to the exact embodiment set forth merely for illustrative purposes.

What is claimed is:

1. A two-piece blind fastener for securing first and second members together from only one side comprising, in combination: a screw having an enlarged head and a shank portion of given diameter, said shank portion merging into a threaded portion of lesser diameter; and a nut of cylindrical shape threadedly receivable on the end of said screw, said nut having an external diameter portion no greater than said given diameter and including a radially expandable tapered thin walled section in its inner end portion whereby insertion of said nut and screw through said opening and tightening of said nut wedges the inner end of said thin walled section between the peripheral edge of said opening and the opposing end portion of said shank, the exterior end portion of said thin walled section including whiskers in the form of tapered, thin, separate elements extending generally towards the head end of said screw and angulated with respect to the axis of said nut in a direction opposite to the thread direction of said screw, the free ends of said whiskers flaring radially outwardly beyond said given diameter to engage said peripheral edge of said opening to prevent rotation of said nut so that further tightening of said screw collapses said thin walled section behind said whiskers in column to cause radial bowing of said thin walled section over said peripheral edge of said opening to lock said first and second members together.

2. A fastener according to claim 1, in which the merging of said shank into said threaded portion defines an annular sloping shoulder upon which said inner end of said thin walled section seats to effect the wedging of said nut against said peripheral edge of said opening.

3. A two-piece fastener for securing first and second members together from only one side comprising, in combination: a screw having a uniform given diameter shank portion terminating in an enlarged head at one end including a screw slot and merging into a smaller diameter threaded portion at its opposite end to define an annular sloping shoulder between said shank and threaded portions; and a cylindrically shaped nut having an outside diameter corresponding substantially to said given diameter and including internal threads in one end portion designed to mate with said threaded portion of said screw, the other interior end portion of said nut having a larger inside diameter increasing in a direction towards the head of said screw to provide a radially expandable tapered thinner wall section, said tapered wall section terminating in an outwardly flared annular chamfer adapted to seat on said annular sloping shoulder of said screw, the external circumferential end portion of said tapered thin wall section being formed with integral whiskers in the form of tapered, thin, separate elements extending generally towards said head of said screw and angulated relative to the axis of said nut in a direction opposite to the thread direction of said threaded portion of said screw, the free ends of said whiskers flaring radially outwardly beyond said given diameter whereby passing of said screw and nut through an opening in said first and second members with said nut partially threaded on said screw and tightening of said screw drives said circumferential end of said tapered thin wall section between the periphery of said opening and said annular sloping shoulder portion of said screw, said whiskers engaging said peripheral portion of said opening to lock said nut against rotation so that continued tightening of said screw causes said tapered thin wall section of said nut behind said whiskers to bow radially outwardly and seat on said peripheral portion of said opening in surface contact over 360 degrees.

4. A fastener according to claim 3, in which said screw includes an annular groove in said annular sloping shoulder portion adapted to receive a portion of said tapered thin walled section to lock said nut to said screw.

5. A fastener according to claim 4, in which the axial extent of said whiskers is no greater than one-half the axial extent of said tapered thin wall section.

6. A fastener according to claim 3, in which at least one of said whiskers is bent radially inwardly to engage said annular sloping shoulder of said screw and thereby position the degree of partial threading of said nut onto said screw prior to insertion of said nut and screw through said opening.

7. A method of pre-assembling a nut and screw for passing into aligned openings of given length in two members to be fastened together from one side wherein said screw is provided with a shank portion merging into a threaded portion of lesser diameter to define an annular sloping shoulder and wherein said nut includes a plurality of whiskers externally formed thereon, comprising the steps of: deforming at least one of said plurality of whiskers by bending the same radially inwardly into a position ahead of the end of said nut facing the head of said screw when said nut is partially threaded onto said screw, the remaining majority of the whiskers having their free ends extending radially outwardly to a dimension greater than the diameter of said shank portion whereby there is provided room immediately about the exterior of the threaded portion adjacent said sloping shoulder for said majority of other whiskers to radially collapse when said pre-assembled nut and screw are passed through said aligned openings; and threading said nut further onto said screw until said one whisker of said nut engages said annular sloping shoulder so that said nut is spaced with respect to said sloping shoulder and the thread of said screw in proper relationship relative to said given length of said openings.

References Cited by the Examiner

UNITED STATES PATENTS

| | | | |
|---|---|---|---|
| 2,077,519 | 4/37 | Frayer | 10—86 |
| 2,313,616 | 3/43 | Bowersox. | |
| 2,371,440 | 3/45 | Hall | 10—86 |
| 2,466,013 | 4/49 | Eaton. | |
| 2,760,399 | 8/56 | Rea. | |
| 2,863,351 | 12/58 | Vaughn. | |
| 2,914,106 | 11/59 | Boyd. | |
| 3,063,329 | 11/62 | Vaughn. | |

FOREIGN PATENTS

| | | |
|---|---|---|
| 343,992 | 3/31 | Great Britain. |

EDWARD C. ALLEN, *Primary Examiner.*